US012205431B2

(12) United States Patent
Hellenbrand et al.

(10) Patent No.: US 12,205,431 B2
(45) **Date of Patent: *Jan. 21, 2025**

(54) STORAGE AND DISPENSING STATION FOR BLISTER PACKAGING MACHINE

(71) Applicant: Becton Dickinson Rowa Germany GmbH, Kelberg (DE)

(72) Inventors: Christoph Hellenbrand, Kaifenheim (DE); Dietmar Gross, Kelberg (DE)

(73) Assignee: Becton Dickinson Rowa Germany GmbH, Kelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,406

(22) Filed: Oct. 27, 2023

(65) Prior Publication Data

US 2024/0054847 A1 Feb. 15, 2024

Related U.S. Application Data

(63) Continuation of application No. 18/098,854, filed on Jan. 19, 2023, now Pat. No. 11,961,353, which is a continuation of application No. 17/332,634, filed on May 27, 2021, now Pat. No. 11,594,095, which is a continuation of application No. 16/898,137, filed on Jun. 10, 2020, now Pat. No. 11,055,948, which is a continuation of application No. 16/452,348, filed on (Continued)

(51) Int. Cl.

| | |
|---|---|
| ***G07F 11/42*** | (2006.01) |
| ***G07F 11/16*** | (2006.01) |
| ***G07F 11/68*** | (2006.01) |
| ***G07F 17/00*** | (2006.01) |

(52) U.S. Cl.
CPC .............. *G07F 11/42* (2013.01); *G07F 11/16* (2013.01); *G07F 11/68* (2013.01); *G07F 17/0092* (2013.01)

(58) Field of Classification Search
CPC ........................................................ G07F 11/16
See application file for complete search history.

(56) References Cited

U.S. PATENT DOCUMENTS

| | | | |
|---|---|---|---|
| 5,709,063 | A | 1/1998 | Yuyama |
| 5,946,883 | A | 9/1999 | Yuyama |

(Continued)

FOREIGN PATENT DOCUMENTS

| | | | |
|---|---|---|---|
| CN | 102883826 | A | 1/2013 |
| EP | 2703299 | A1 | 3/2014 |

(Continued)

OTHER PUBLICATIONS

Australia Office Action for Application No. 2018215105, dated Nov. 30, 2021, 3 pages.

(Continued)

*Primary Examiner* — Gene O Crawford
*Assistant Examiner* — Ayodeji T Ojofeitimi
(74) *Attorney, Agent, or Firm* — Morgan, Lewis & Bockius LLP

(57) ABSTRACT

A method of operating a storage and dispensing station for drug portions includes rotatably disposing a singulating device in a storage container, providing, with a conductor device, an electrically conductive coupling between the singulating device and a contact, and dissipating an electrical charge from the singulating device.

19 Claims, 5 Drawing Sheets

Related U.S. Application Data

Jun. 25, 2019, now Pat. No. 10,741,002, which is a continuation of application No. 15/423,870, filed on Feb. 3, 2017, now Pat. No. 10,380,824.

(56) References Cited

U.S. PATENT DOCUMENTS

| | | | |
|---|---|---|---|
| 6,119,737 | A | 9/2000 | Yuyama |
| 7,040,070 | B2 | 5/2006 | Yuyama |
| 7,185,476 | B1 | 3/2007 | Siegel |
| 7,637,078 | B2 | 12/2009 | Ishiwatari |
| 8,757,346 | B2 | 6/2014 | Imai |
| 8,833,602 | B1 | 9/2014 | Balasubramanian et al. |
| 8,833,603 | B1 | 9/2014 | Balasubramanian et al. |
| 10,741,002 | B2 | 8/2020 | Hellenbrand et al. |
| 11,961,353 | B2 * | 4/2024 | Hellenbrand ........... G07F 11/16 |
| 2002/0007868 | A1 | 1/2002 | Kodama |
| 2003/0074868 | A1 | 4/2003 | Yasuoka |
| 2003/0156925 | A1 | 8/2003 | Kim |
| 2004/0182878 | A1 | 9/2004 | Ho |
| 2004/0226855 | A1 | 11/2004 | Kim |
| 2005/0115634 | A1 | 6/2005 | Kobayashi |
| 2005/0145644 | A1 | 7/2005 | Mori |
| 2006/0167586 | A1 | 7/2006 | Kobayashi |
| 2007/0022713 | A1 | 2/2007 | Yuyama |
| 2008/0029530 | A1 | 2/2008 | Yuyama |
| 2008/0093372 | A1 | 4/2008 | Milton |
| 2008/0282646 | A1 | 11/2008 | Gertitschke |
| 2009/0133362 | A1 | 5/2009 | Bentele |
| 2011/0178634 | A1 | 7/2011 | Yuyama |
| 2012/0042609 | A1 | 2/2012 | Inoue |
| 2014/0103063 | A1 | 4/2014 | Yuyama |
| 2014/0183208 | A1 | 7/2014 | Bae et al. |
| 2014/0203034 | A1 | 7/2014 | Bae et al. |
| 2014/0245697 | A1 | 9/2014 | Omura et al. |
| 2014/0246451 | A1 | 9/2014 | Yuyama |
| 2014/0366489 | A1 | 12/2014 | Scholten |
| 2015/0197391 | A1 | 7/2015 | Yuyama |
| 2015/0203227 | A1 | 7/2015 | Lokkers et al. |
| 2015/0225101 | A1 | 8/2015 | Van Wijngaarden |
| 2015/0251789 | A1 | 9/2015 | Lokkers |
| 2015/0298839 | A1 | 10/2015 | Van De Koot |
| 2016/0184185 | A1 | 6/2016 | Kim |
| 2016/0193114 | A1 | 7/2016 | Hellenbrand |
| 2017/0057682 | A1 | 3/2017 | Chudy |

FOREIGN PATENT DOCUMENTS

| | | | |
|---|---|---|---|
| EP | 2962956 | A1 | 1/2016 |
| EP | 304953 | | 7/2016 |
| EP | 3040953 | A1 | 7/2016 |
| JP | H09095312 | A | 4/1997 |
| JP | 2005059903 | A | 3/2005 |
| WO | WO-2013034504 | | 3/2013 |

OTHER PUBLICATIONS

Australia Office Action for Application No. 2022209243, dated Jun. 1, 2023, 5 pages.

Australian Office Action for Application No. 2022209243, dated Aug. 21, 2023, 4 pages.

European Search Report dated Jul. 18, 2017 in corresponding EP Appln. No. 17154512.2 (8 pages).

India Office Action for Application No. 201927025369, dated May 13, 2021, 7 pages.

International Preliminary Report on Patentability for Application No. PCT/EP2018/050133, dated Aug. 6, 2019, 7 pages.

Japan Office Action for Application No. 2019-539274, dated Aug. 24, 2021, 14 pages including translation.

Korea Office Action for Application No. 10-2019-7018419, dated Jan. 27, 2022, 10 pages including translation.

Singapore Office Action for Application No. 11201906234U, dated Jul. 1, 2020, 9 pages.

Slip ring [retrieved from internet on May 31, 2023] <URL: https://en.wikipedia.org/w/index.php?title=slip_ring&oldid=752237614>, published on Nov. 30, 2016.

United Arab Emirates Office Action for Application No. P6001087/2019, dated Mar. 20, 2023, 9 pages.

* cited by examiner

STORAGE AND DISPENSING STATION FOR BLISTER PACKAGING MACHINE

CROSS-REFERENCE TO RELATED APPLICATION

This is a continuation of patent application Ser. No. 18/098,854, filed on Jan. 19, 2023, issued as U.S. Pat. No. 11,961,353 on Apr. 16, 2024, entitled "STORAGE AND DISPENSING STATION FOR BLISTER PACKAGING MACHINE," which is a continuation of patent application Ser. No. 17/332,634, filed on May 27, 2021, entitled "STORAGE AND DISPENSING STATION FOR BLISTER PACKAGING MACHINE," which issued as U.S. Pat. No. 11,594,095, on Feb. 28, 2023, which is a continuation of patent application Ser. No. 16/898,137, filed on Jun. 10, 2020, entitled "STORAGE AND DISPENSING STATION FOR BLISTER PACKAGING MACHINE," which issued as U.S. Pat. No. 11,055,948, on Jul. 6, 2021, which is a continuation of patent application Ser. No. 16/452,348, filed on Jun. 25, 2019, entitled "STORAGE AND DISPENSING STATION FOR BLISTER PACKAGING MACHINE," which issued as U.S. Pat. No. 10,741,002, on Aug. 11, 2020, which is a continuation of patent application Ser. No. 15/423,870, filed on Feb. 3, 2017, entitled "STORAGE AND DISPENSING STATION FOR BLISTER PACKAGING MACHINE," which issued as U.S. Pat. No. 10,380,824, on Aug. 13, 2019, the contents of each which is hereby incorporated by reference in its entirety, for all purposes.

TECHNICAL FIELD

The present disclosure relates to a storage and dispensing station for a blister packaging machine for drug portions.

BACKGROUND

Modern blister packaging machines include one or more storage and dispensing stations. A plurality of drug portions is stored therein, and individual drug portions are dispensed on request. The drug portions stored in the storage and dispensing stations are assembled and blister-packed on an individual patient basis according to medically prescribed ingestion times.

In order to assemble a plurality of drug portions, appropriate storage and dispensing stations for dispensing one or more drug portions are activated by a control device of the blister packaging machine. To dispense a drug portion, a drug portion stored in a storage container is separated by a singulating device of the storage and dispensing station and transferred, via a dispensing opening, to a guide device of the blister packaging machine. By the guide device, the dispensed drug portion is conveyed to a packaging device which blister-packs individual or multiple drug portions.

SUMMARY

In many drug packaging settings, it is desirable to provide a storage and dispensing station with a reduced propensity to collect small flakes or particles of drug portions.

In one or more embodiments, the present disclosure provides a method of operating a storage and dispensing station for drug portions, the method comprising rotatably disposing a singulating device in a storage container, providing, with a conductor device, an electrically conductive coupling between the singulating device and a contact, and dissipating an electrical charge from the singulating device.

BRIEF DESCRIPTION OF THE DRAWINGS

The devices according to embodiments of the present disclosure are described in greater detail below, with reference to the appended drawings, wherein.

DETAILED DESCRIPTION

Figure 1A:
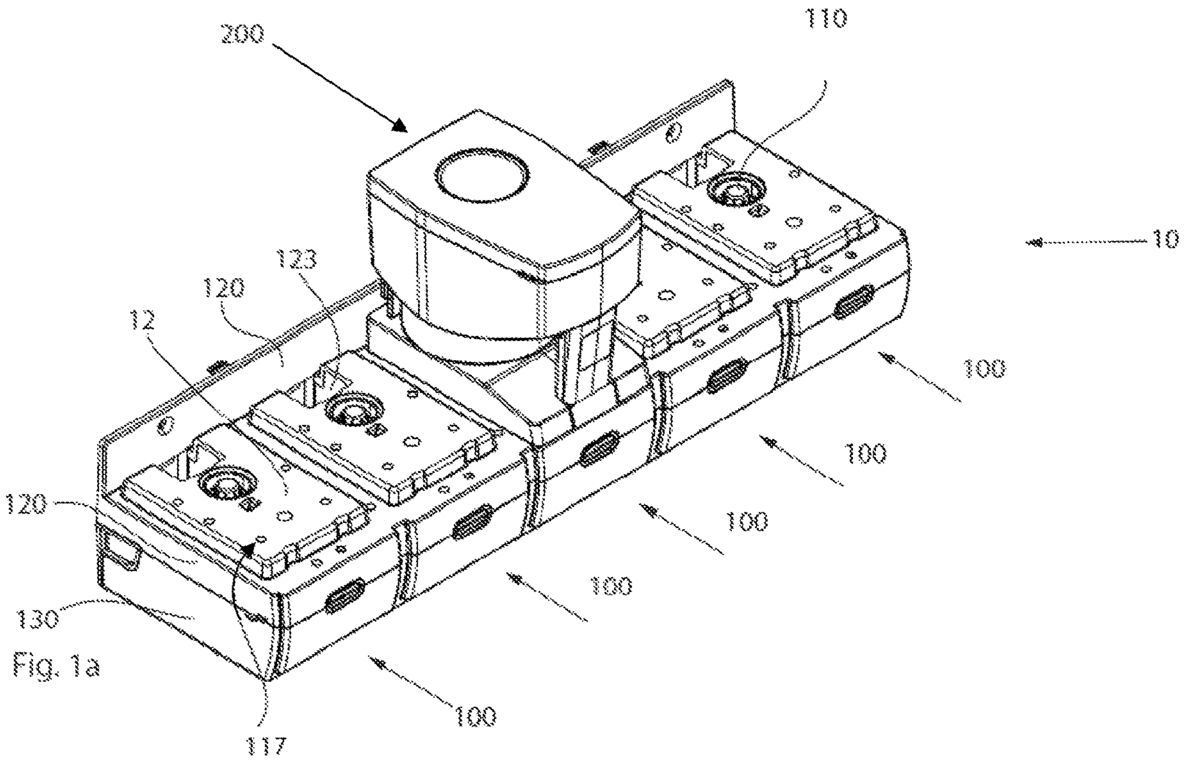
FIGS. 1*a* and 1*b* illustrate a storage and dispensing station having a separate base and storage container according to exemplary embodiments of the present disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In order to separate drug portions, a singulating device is rotated by a drive. The rotation of the singulating device causes at least some drug portions stored in a storage container to come into contact with one another, and also with the singulating device during the separation process. Flaking of the drug portions may occur, resulting in drug dust settling on the singulating device and the storage container. An accumulation of drug dust is undesirable, as cleaning the storage container becomes more difficult. Further, the drug dust may be conveyed into other components of the blister packaging machine and may be blister-packed with other kinds of drug portions, leading to an undesirable mixing of medications.

According to the disclosure, a singulating device is electrically conductive at least at its outer surface, which comes into contact with drug portions to be singulated. A conductor device is provided, by which the outer surface of the singulating device is coupled to a contact in an electrically conductive manner. Thereby, an electrical connection exists between the outer surface of the singulating device and the contact, by which electrical, or electrostatic, charges can be transferred to the blister packaging machine.

The rotation of the singulating device may lead to friction between drug portions, friction between drug portions and the singulating device and friction between the singulating device and the storage container. Such friction may be sufficient to cause an electrostatic charge to accumulate on one or more components of the storage and dispensing station and the storage container.

The accumulated electrostatic charge of the singulating device can be dissipated via a contact to the blister packaging machine which forms, or has, a reference potential with respect to the singulating device. Such a reduction in the electrostatic charge of the singulating device prevents, or lessens, accumulation of the drug dust produced during singulation on the singulation device.

The above-mentioned electrostatic charge may also prevent drug portions from freely sliding on, or over, electrostatically charged components of the storage and dispensing station. This may lead to dispensing malfunctions, particularly with smaller medications.

The singulating device is rotatably disposed in a cylindrical receiving chamber of the housing. However, the singulating device can be accommodated fully in the receiving chamber, or an upper section of the singulating device can project from the cylindrical receiving chamber.

A storage and dispensing station is electrically coupled to the blister packaging machine by the contact such that electrical charges can be dissipated to the blister packaging machine. When the dispensing and storage station is coupled to a blister packaging machine via the contact, the singulating device may be thereby electrically grounded. The contact can be disposed on various portions of the base, storage container or on other components.

A base and the storage container of the storage and dispensing station can be separable components, and the storage container can be placed onto the base.

The base may be releasably attached to the blister packaging machine, wherein an electrical connection between a blister packaging machine and a base may, for example, a supply power for a drive and/or a cable for a control unit of the storage and dispensing station.

In some embodiments of the storage and dispensing station, the contact is provided with a ground wire, which may be coupled to a motor of the drive. In such an embodiment, a component or group of components, namely the grounding wire of the motor of the drive, is used to dissipate electrical charges.

The singulating device is electrically conductive at least on an outer surface thereof, which comes into contact with drug portions to be singulated. The outer surface of the singulating device may be formed as a planar conductive coating. Here, a cost-effective, non-conductive material can be used as carrier material and a more cost-intensive conductive coating, which is then coupled in an electrically conductive manner to the contact by the conductor device, can be provided only in those areas which come into contact with drug portions to be singulated.

In the above-mentioned embodiments, an electrically conductive coating is applied to a base body. In some embodiments, the singulating device, at least in the case of its outer surface, is made of an electrically conductive material, which may be an electrically conductive plastic. This conductive region is electrically coupled to the contact. Depending on materials and manufacturing costs, the singulating device may consist entirely of a conductive material.

To enable the electrostatic charge to be dissipated, a conductor device, by which the outer surface of the singulating device is electrically coupled to the contact, allows the accumulated electrical charge to be dissipated to the blister packaging machine. In some embodiments, the conductor device includes a slip ring disposed in the bottom surface and/or in a housing section which forms the cylindrical receiving chamber. One or more contact elements are arranged in the singulating device. By the contact element, an electrical connection is formed between the singulating device and the slip ring, which is electrically coupled to the contact. The contact element can be a kind of spring contact, for example, which rests temporarily or permanently on the slip ring. The slip ring itself can be continuously formed, or the slip ring can be formed by a plurality of segments, each of which is only temporarily in contact with the contact element. These segments can then be electrically connected to one another, or can be electrically connected individually to the contact.

In some embodiments, the conductor device includes an electrically conductive drive hub, an electrically conductive drive shaft, an electrically conductive motor, and an electrically conductive coupling. An outer surface of the singulating device is electrically coupled to the coupling, the coupling includes, or is electrically coupled to the motor, and the motor is coupled to the contact. In some embodiments, these components electrically conduct in such a way that the electrical charge of the singulating device is dissipated to the blister packaging machine using the above-mentioned components. In some examples, an electrical charge of the singulating device is dissipated from the outer surface thereof, to the electrically conductive drive hub and electrically conductive drive shaft, to the electrically conductive motor, which is in turn electrically coupled to the contact. This allows for the dissipation of electrical charge from the outer surface to the contact, and thus to the blister packing machine. The coupling may include one or more of the motor, drive hub, drive and drive shaft.

The drive motor of the storage and dispensing station is coupled to the central power supply of the blister packaging machine by a cable. Further, the motor is connected to a blister packaging machine by the contact, and this contact ensures that the motor is grounded. In this way, charges, which are transferred to the motor by the coupling, the drive hub and/or the drive shaft, can be dissipated to the blister packaging machine.

Due to the electrostatic charge of the singulating device, drug dust may accumulate on said singulating device. However, due to the friction resulting from the singulation process, other components of the storage and dispensing station also become electrostatically charged. In some embodiments, portions or surfaces of the bottom surface, the cylindrical section of the housing and/or other sections of the housing which come into contact with drug portions are also electrically conductive, and are electrically coupled to the contact. The above-mentioned components or component sections may be provided with an electrically conductive coating, or can be made entirely from an electrically conductive material.

Figure 1B:
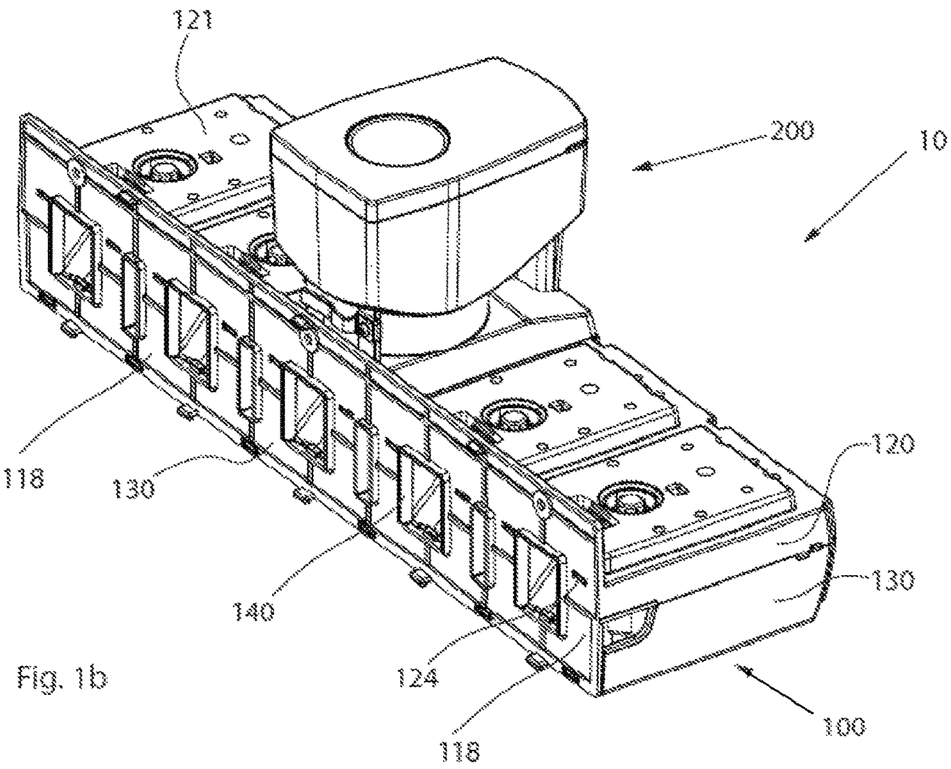

FIGS. 1*a* and 1*b* illustrate a storage and dispensing station 10. In exemplary embodiments, the storage and dispensing station 10 includes a base 100 and a storage container 200, and the storage container 200 is formed as a separate component from the base 100.

The base 100 is, in some embodiments, one of a plurality of bases 100, as shown in FIGS. 1*a* and 1*b*. In some embodiments, the plurality of bases 100 includes five bases 100. In some embodiments, each of the plurality of bases 100 is formed separately from one another. In some embodiments, each of the plurality of bases 100 is combined with one another to form a single base group. The elements mentioned in the following description may be present in each base 100, regardless of whether each of the plurality of bases 100 is formed as a single base group (as shown in FIGS. 1*a* and 1*b*) or formed separately.

Each base 100, according to exemplary embodiments, includes a bottom section 130 and a top section 120. The top section 120 includes a top projection 121 onto which a storage container 200 can be disposed, or placed. For this purpose, a bottom housing section 212 (shown in FIG. 2) of the storage container 200 corresponds to a geometry of the top projection 121.

A face 118 of a base 100, shown in FIG. 1*b* and formed by the top section 120 and the bottom section 130, may be attached to a blister packaging machine 20. A chute 140, through which separated drug portions are transferred from the storage and dispensing station 10 to the blister packaging machine 20, is formed in the face 118. The chute 140 extends through the base 100 to the top projection 121. An opening 123 is formed in the top projection 121 to receive a drug portion.

On the face 118 of the base 100, a contact 124 is provided, through which the storage and dispensing station 10 is electrically coupled to the blister packaging machine 20 and by which electrical current, signals and/or electrostatic charge can be transmitted from the storage and dispensing station 10 to the blister packaging machine 20. In some embodiments, the contact 124 is disposed on a portion of the face 118 formed by the top section 120. In some embodiments, the contact 124 is disposed on a portion of the face 118 formed by the bottom section 130. The contact 124 may include, or be disposed within, a plug or a similar device. In exemplary embodiments, as shown in FIG. 1*a*, a conductor device 117 is electrically coupled to both the contact 124 and to an outer surface of a singulating device (described below).

Figure 2:
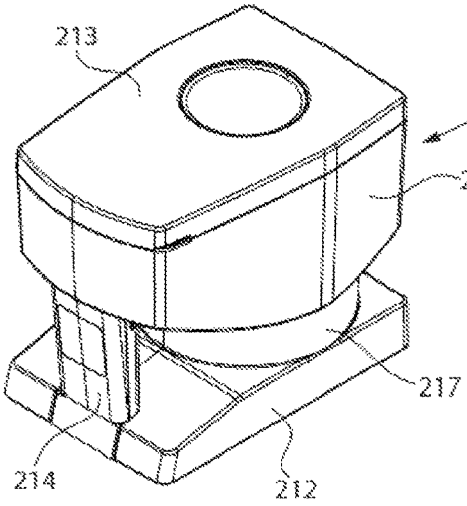
FIG. 2 is a perspective view of a storage container according to exemplary embodiments of the present disclosure.

FIG. 2 is a perspective view of a storage container according to exemplary embodiments of the present disclosure. In some embodiments, as described above, the base 100 and the storage container 200 are separate components. The storage container 200 includes a housing 210 having a receiving section 217, a cylindrical receiving chamber 211 (shown in FIG. 3), a bottom housing section 212 and a handle 214. The storage container 200 includes a cover 213 removably disposed on the storage container 200.

Figure 3:
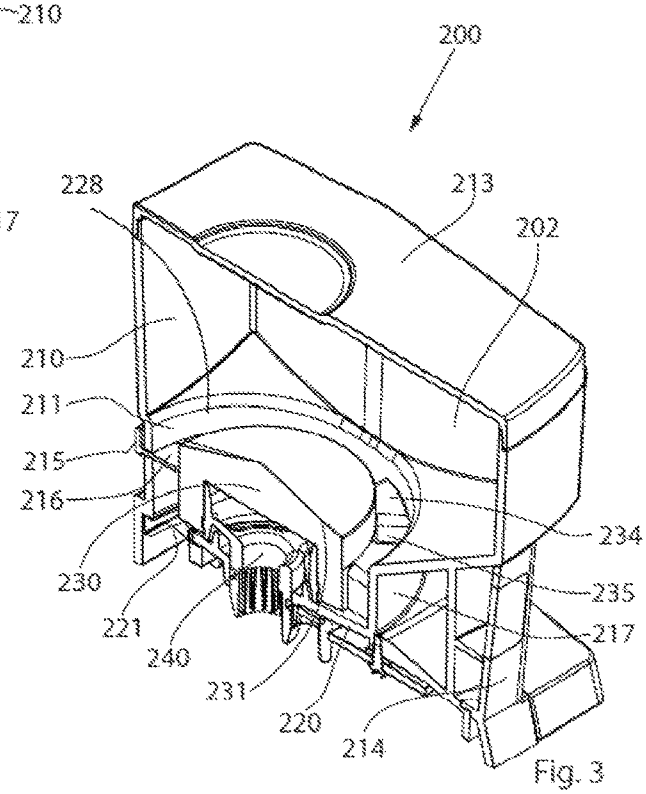
FIG. 3 is a cross sectional view of a storage container according to exemplary embodiments of the present disclosure.

An exemplary arrangement of a singulating device 230 in the cylindrical receiving chamber 211 of the receiving section 217 is shown in FIG. 3. The singulating device 230 includes a rotor 226 having a plurality of projections 234 and channels 235. The plurality of projections 234 and channels 235 extend in an axial direction through, or along, the singulating device 230. The channels 235 are defined by the projections 234, which run along a central component of the singulating device 230 so that the channels 235 are open to an outer circumference 280 of the singulating device 230. The plurality of channels 235 extends along the singulating device 230, and parallel with a rotational axis 300 of the singulating device 230, best shown in FIG. 8.

The singulating device 230 includes a central conical cover surface 232 which, together with the housing 210, defines a receiving chamber 202 for drug portions. Due to a shape of the central conical cover surface 232, drug portions resting thereon slide towards the channels 235.

A step 227 is formed between the central conical cover surface 232 and the projections 234, and an annular chamber 228 is formed in the region above the channels 235 and the projections 234. The annular chamber 228 facilitates the sliding of drug portions into the channels 235.

As can be seen in FIG. 3, a bottom surface 220 includes a dispensing opening 221 through which drug portions are passed to the chute 140 via the opening 123 in the top projection 121 of the base 100 (as shown in FIG. 1*a*).

As can further be seen in FIG. 3, a retaining section 216 of a retainer 215 is disposed in the annular chamber 228 above the dispensing opening 221. In addition, the dispensing opening 221 is disposed in the cylindrical receiving chamber 211 of the housing 210. The retainer 215 and the retaining section 216 retain drug portions arranged in the receiving chamber 202 above the dispensing opening 221 when a channel 235 is aligned, or is vertically aligned, with the dispensing opening 221.

The separation and dispensing of drug portions involves, in exemplary embodiments, a channel 235 containing a defined number of drug portions being positioned over the dispensing opening 221, and the drug portions are then dispensed from the aligned channel 235. The retaining section 216 prevents drug portions overlying, or disposed above, the retaining section 216 in the channel 235 from being dispensed. This ensures that only the appropriate number of drug portions arranged in the channel 235 is dispensed.

As shown in FIG. 3, the singulating device 230 further includes a coupling 240 with which the singulating device 230 is coupled to a drive 224, by which the singulating device 230 is rotated to separate drug portions. In exemplary embodiments, the coupling 240 is designed as a distinct component. However, in some embodiments, the coupling 240 is formed integrally with the singulating device 230.

One or more portions of the singulating device 230 are electrically conductive. In some embodiments, an outer surface 231 of the singulating device 230, which comes into contact with drug portions to be singulated, is electrically conductive. In exemplary embodiments, the singulating device 230 includes an outer surface 231. The outer surface 231 may include a planar conductive coating.

A conductor device 117 is provided in order to transfer electrical currents, signals, or electrostatic charges, from the singulating device 230 to the contact 124 (see FIG. 1*b*). The electrical charges, or signals, are then conveyed to the blister packaging machine 20. In some embodiments, the conductor device 117 includes a contact element 236, 237 arranged in, or on, the singulating device 230.

As shown in FIG. 3, the singulating device 230 is disposed within the cylindrical receiving chamber 211. As described, the projections 234 form an annular chamber 228 within the housing 210. In some embodiments, the cylindrical receiving chamber 211 or the singulating device 230 can also be designed such that the projections 234 project above the cylindrical receiving chamber 211. When projections 234 and channels 235 are open to the outer circumference 280 of the singulating device 230, drug portions can also enter the channels 235 from a side direction relative to the singulating device 230, in addition to a top direction relative to the singulating device 230.

Figure 4:
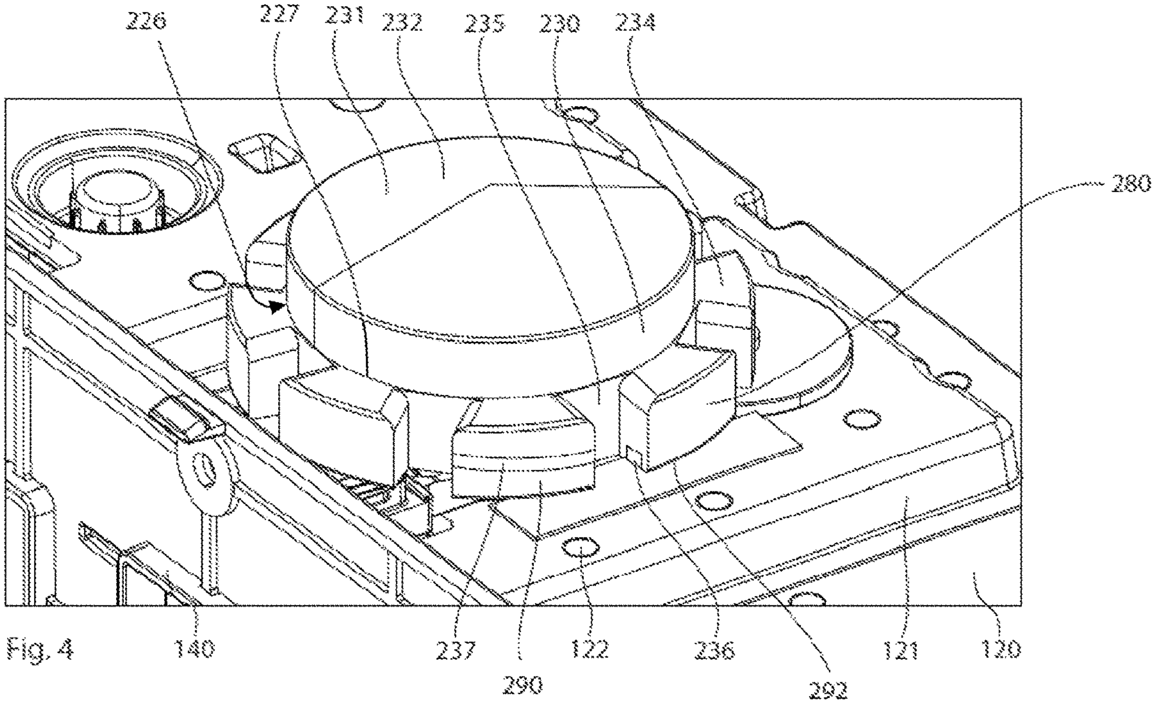
FIG. 4 is a perspective view of a singulating device disposed inside a storage container according to exemplary embodiments of the present disclosure.

FIG. 4 illustrates exemplary embodiments of contact elements 236, 237. FIG. 4 illustrates the contact element 237 disposed on an outer region 290 of a projection 234. FIG. 4 also illustrates the contact element 236 disposed on an underside 292 of a projection 234. An electrical connection between a slip ring 222 (see FIG. 5) in the bottom surface 220 and the contact element 236, and or between another slip ring 296 (see FIG. 6) disposed in the receiving section 217 and the contact element 237 may be formed.

Figure 6:
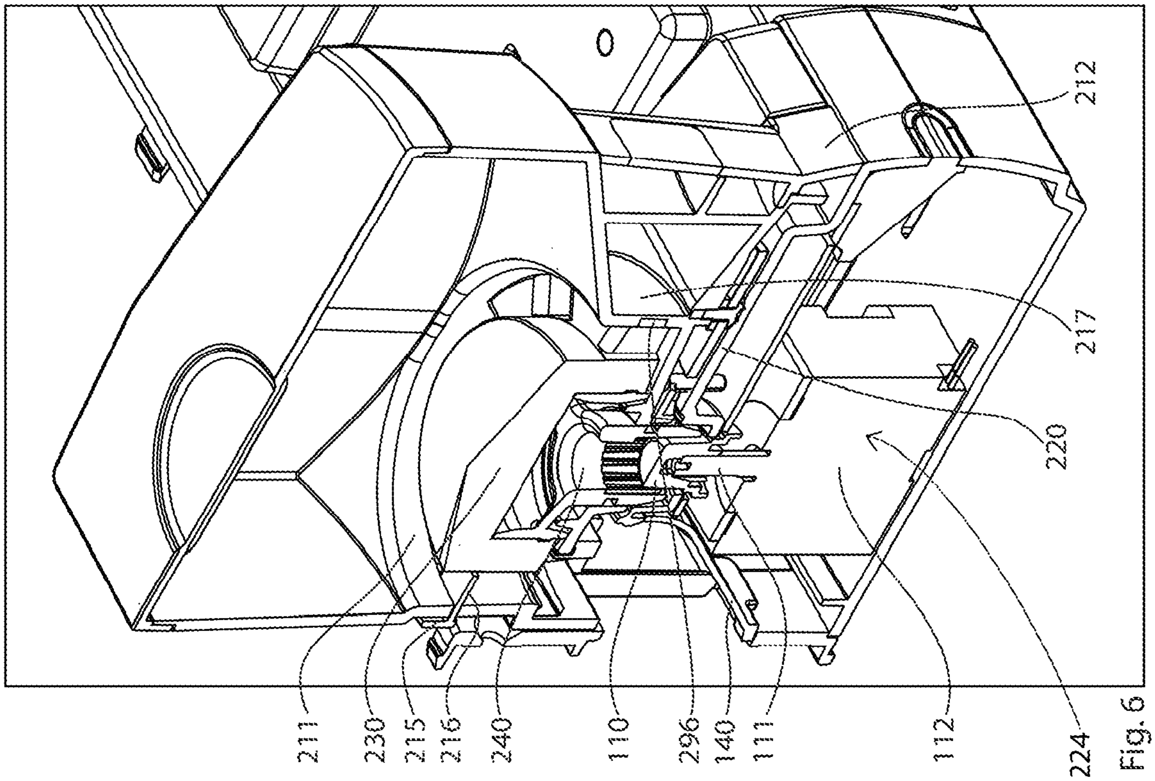
FIG. 6 is a cross sectional view of a storage and dispensing station according to exemplary embodiments of the present disclosure.
Figure 5:
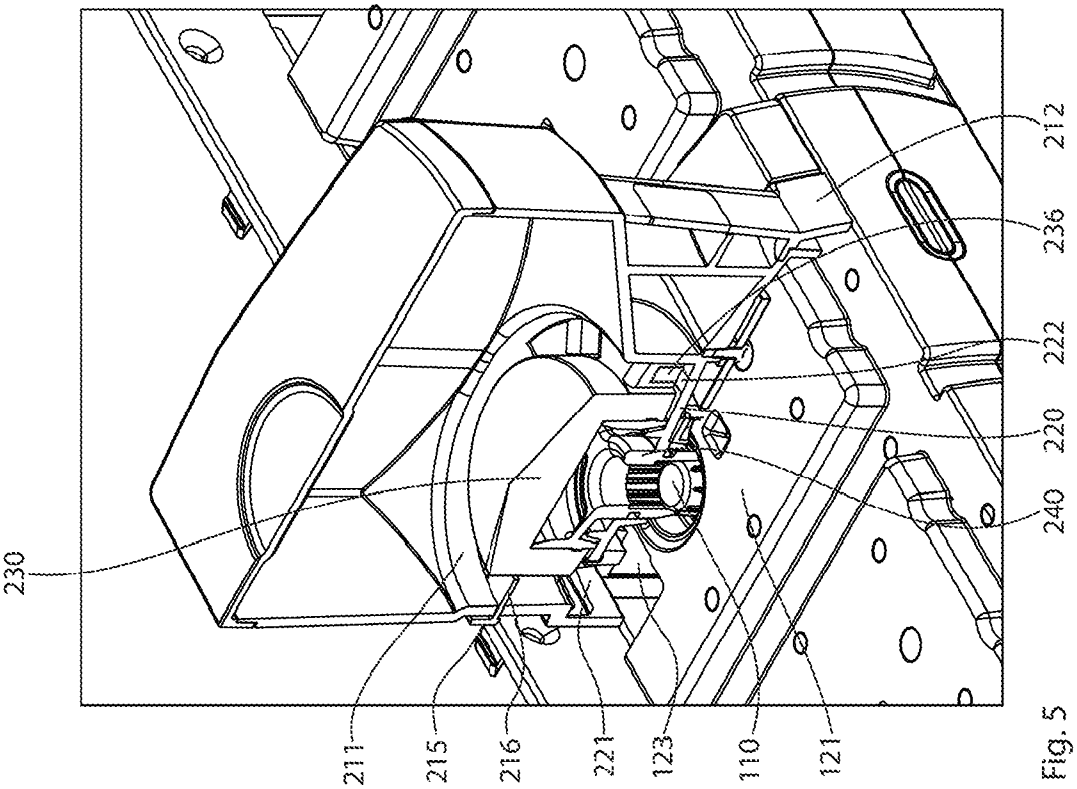
FIG. 5 is a cross sectional view of a storage container mounted on a base according to exemplary embodiments of the present disclosure.

FIG. 5 is a cross sectional view of a storage container 200 mounted on a base 100 according to exemplary embodiments of the present disclosure. FIG. 6 is a cross sectional view of a storage and dispensing station 10 according to exemplary embodiments of the present disclosure.

FIGS. 5 and 6 show the coupling 240 disposed between the base 100 and storage container 200, which are formed as separate components. In operation, the storage container 200 is placed onto the top projection 121 of the base 100, such that the bottom housing section 212 appropriately interfaces with the top projection 121.

FIG. 6 shows the coupling 240 disposed between the singulating device 230 and the drive 224 arranged in the base. The drive includes a motor 112, a drive shaft 111 and a drive hub 110. The drive hub 110, in a frictional or interference manner, rotates the coupling 240 which, in turn, rotates the singulating device 230 by an appropriate connection, which may be a frictional or interference relationship. In exemplary embodiments, the coupling 240 is formed integrally with the singulating device 230.

In FIGS. 5 and 6, the singulating device 230 is shown in a dispensing position. One channel 235 is vertically aligned with the dispensing opening 221 in the bottom surface 220. Drug portions arranged in the channel 235 may fall through the dispensing opening 221 into the chute 140, and then pass to the blister packaging machine 20.

Above the channel 235, which is aligned with the dispensing opening 221, the retaining section 216 of the retainer 215 is disposed in the annular chamber 228 and ensures that no further drug portions slide out of the cylindrical receiving chamber 211.

Figure 7:
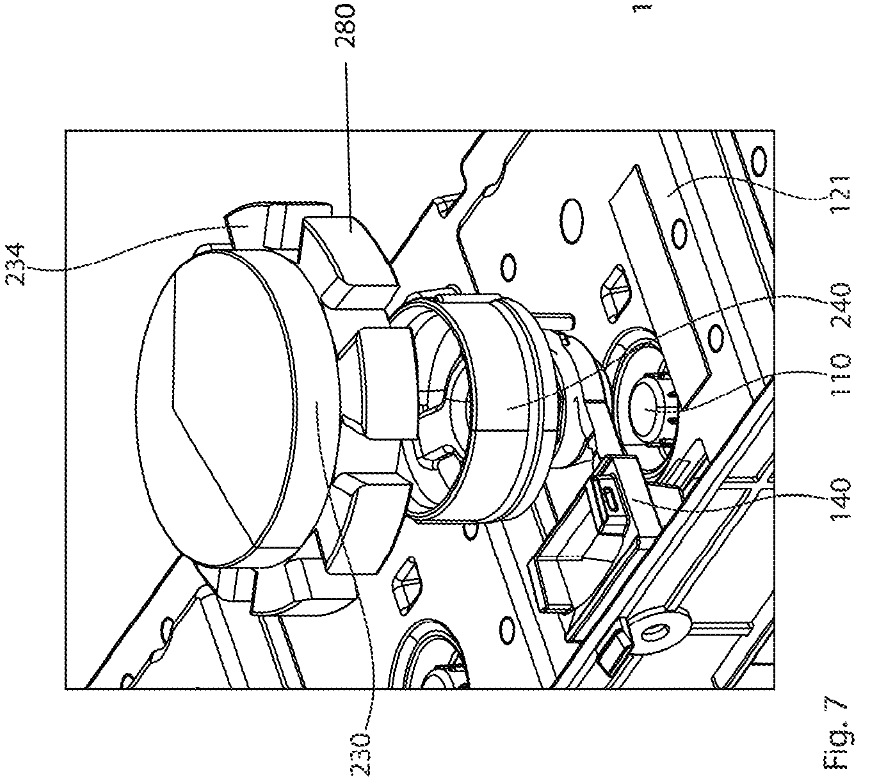
FIG. 7 is an exploded view of a storage device and a drive according to exemplary embodiments of the present disclosure.

FIG. 7 is an exploded view of an interface between a storage container 200 and a drive 224 according to exemplary embodiments of the present disclosure. The drive hub 110 can be seen through an opening in the top projection 121 of the top section 120 of the base 100. The coupling 240 and the singulating device 230 are also visible. In exemplary embodiments, the coupling 240 is a distinct component relative to the singulating device 230.

Figure 8:
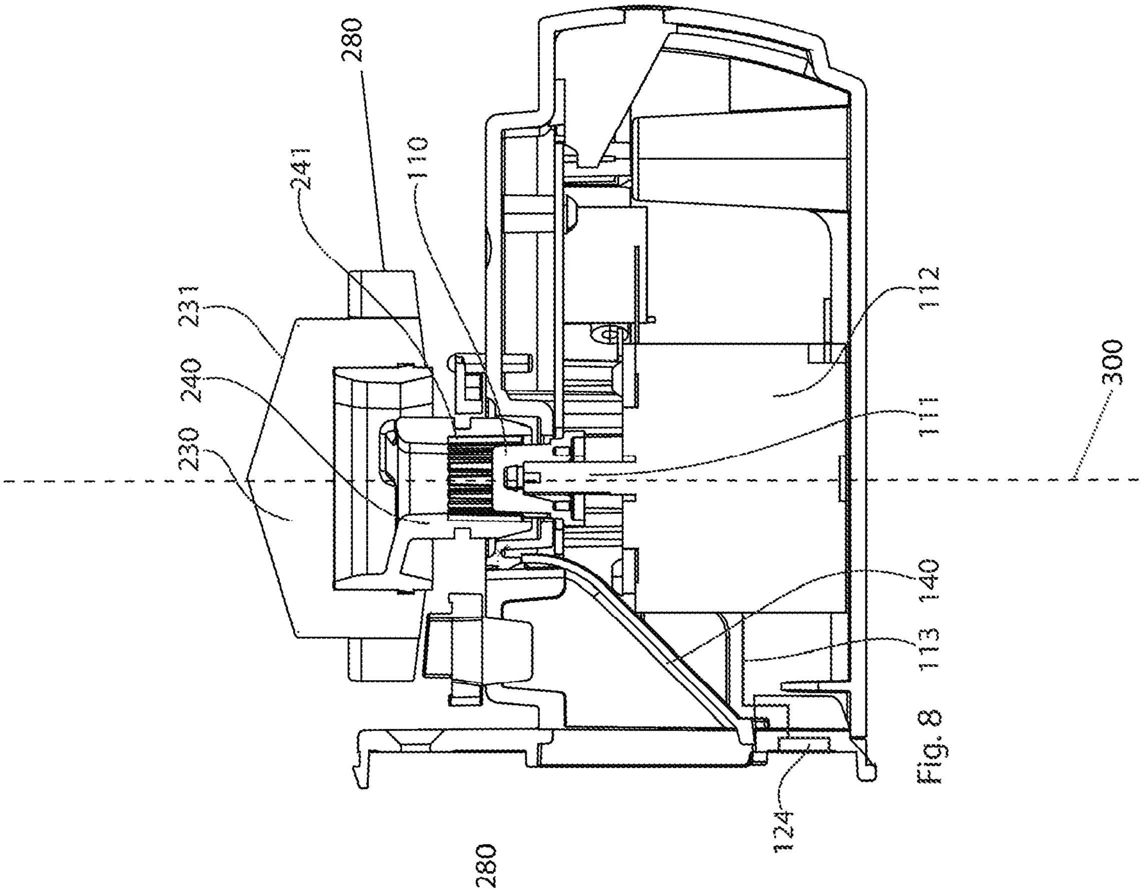
FIG. 8 is a cross sectional view of a storage and dispensing station according to exemplary embodiments of the present disclosure.

FIG. 8 is a cross sectional view of a storage and dispensing station 10 according to exemplary embodiments of the present disclosure, in particular showing the coupling 240.

The motor 112, which may be an electric motor, is connected to the contact 124 by a cable 113, and the motor 112 is arranged centrally within the base 100. The contact 124 supplies electrical power for the motor 112. Further, a sensor (not shown), which determines whether a drug portion has actually dispensed in a dispensing operation, can be associated with the chute 140 or the dispensing opening 221 in the bottom surface 220.

The motor 112 may include the drive shaft 111, which ends in the drive hub 110. The drive hub 110, in some embodiments, rotates together with an inner contour 241 of the coupling 240 in an interlocking and releasable manner. The coupling 240 is, in some embodiments, releasably connected to the singulating device 230.

Such a connection between drive hub 110 and coupling 240 of the singulating device ensures that the storage container 200 can be easily removed from the base 100.

The outer surface 231 of the singulating device 230 is coupled in an electrically conductive manner, via the conductor device 117, to the contact 124. In exemplary embodiments, the coupling 240, the drive hub 110, the drive shaft 111 and the motor 112 form components of the conductor device 117.

The coupling 240 is electrically conductive and is electrically connected to the outer surface 231 of the singulating device 230. This can be achieved, for example, by using a singulating device 230 which consists entirely of a conductive material, for example a metal or an electrically conductive plastic. In some embodiments, cables can be provided from the outer surface 231 to the coupling 240. The drive hub 110 and the drive shaft 111 are also electrically conductive.

An electrostatic charge which occurs during separation, or singulation, can be transferred via the outer surface 231 of the singulating device 230 to the coupling 240. The electrostatic charge can then be transferred from the coupling 240 to the drive hub 110 and drive shaft 111, or the electrostatic charge can be transferred from the outer surface 231 to the drive hub 110 and drive shaft 111. The electrostatic charge can then be transferred from the drive shaft 111 and/or drive hub 110, via the motor 112 and/or the cable 113, to the contact 124, by which the electrostatic charge is then transferred to the blister packaging machine 20.

In the exemplary embodiments, a number of components required to dissipate the charge is minimized. Due to the design and arrangement of the disclosed components, a build-up of a potential difference is avoided and adhesion of drug dust and other fine contamination is prevented. The singulating device 230 and/or other components of the storage container 200 which come into contact with drug portions (cylindrical receiving chamber 211 and the housing 210) are effectively grounded via the blister packaging machine 20.

Figure 9:
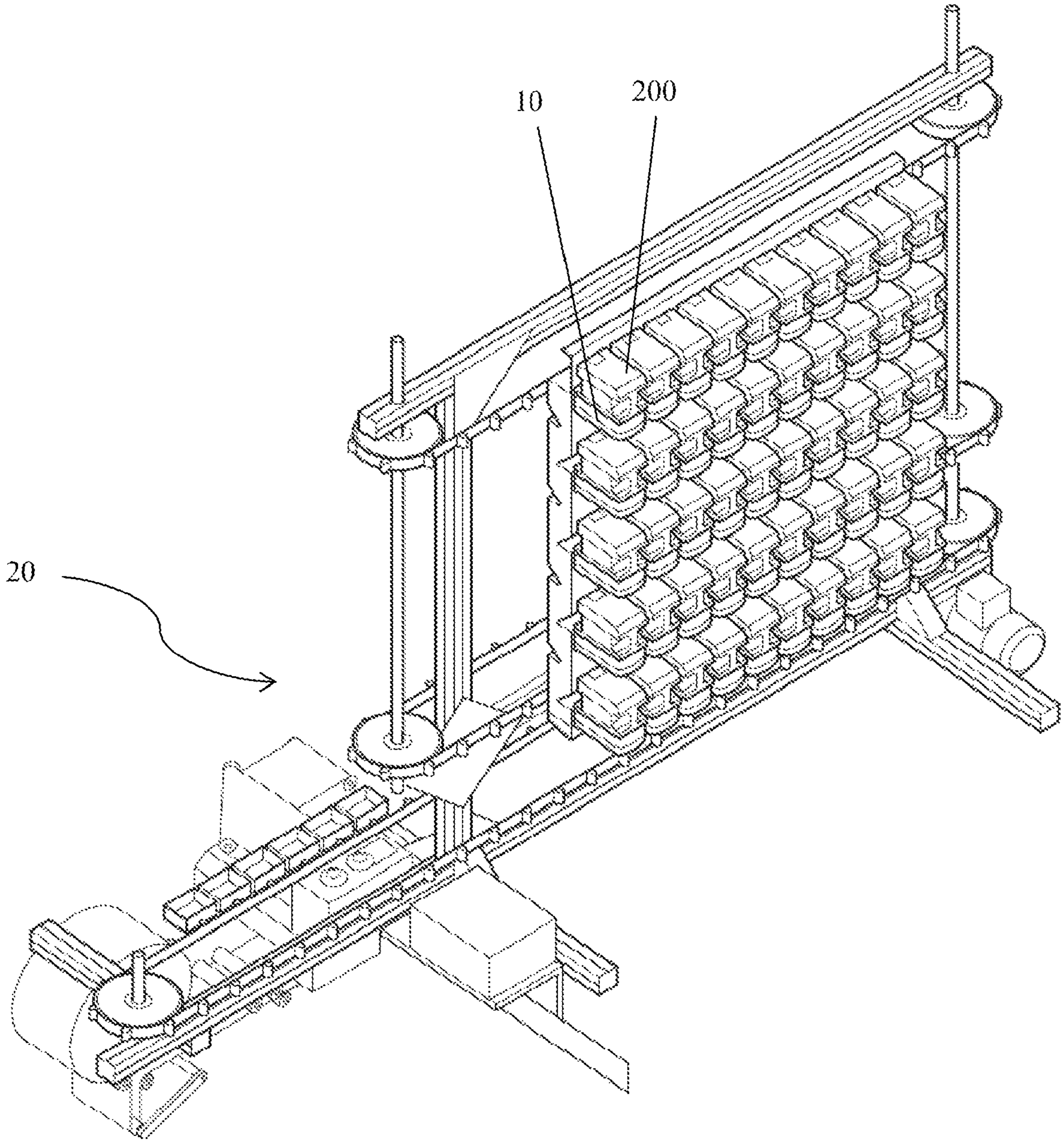
FIG. 9 is a perspective view of a dispensing station, a storage container and a blister packing machine according to exemplary embodiments of the present disclosure.

FIG. 9 is a perspective view of a dispensing station 10, a storage container 200 and a blister packaging machine 20 according to exemplary embodiments of the present disclosure. In particular, FIG. 9 illustrates multiple dispensing stations 10 having storage containers 200 that are mounted and/or connected to the blister packing machine 20.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject technology.

The word “exemplary” or the term “for example” is used herein to mean “serving as an example or illustration.” Any aspect or design described herein as “exemplary” or “for example” is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U. S. C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102 or 103, nor should they be interpreted in such a way.

What is claimed is:

1. A method of operating a storage and dispensing station for drug portions, the method comprising:

rotatably disposing a singulating device in a storage container;

providing, with a conductor device, an electrically conductive coupling between the singulating device and a contact; and dissipating an electrical charge from the singulating device.

2. The method of claim 1, comprising:

dispensing one or more drug portions stored within the storage container through a dispensing opening in a bottom surface of the storage container.

3. The method of claim 2, comprising:

dispensing the one or more drug portions stored from the dispensing opening to a chute in the storage and dispensing station.

4. The method of claim 2, comprising:

aligning a channel of the singulating device with the dispensing opening; and securing, by a retaining section, drug portions above the dispensing opening.

5. The method of claim 1, wherein the contact includes a ground wire coupled to a motor of a drive for rotating the singulating device, the method comprising:

dissipating the electrical charge through the ground wire.

6. The method of claim 1, wherein an outer surface of the singulating device includes a planar conductive coating, the method comprising:

dissipating the electrical charge from the planar conductive coating to the contact.

7. The method of claim 1, wherein an outer surface of the singulating device includes an electrically conductive material, the method comprising:

dissipating the electrical charge from the electrically conductive material to the contact.

8. The method of claim 1, wherein the conductor device includes a slip ring disposed in a bottom surface of the storage container and a contact element disposed in the singulating device, the method comprising:

dissipating the electrical charge from the contact element to the slip ring and to the contact.

9. The method of claim 1, wherein the conductor device includes a slip ring disposed in a housing section of the storage container that defines a cylindrical receiving chamber and wherein the storage container further comprises a contact element disposed in the singulating device, wherein the singulating device is disposed within the cylindrical receiving chamber, the method comprising:

dissipating the electrical charge from the contact element to the slip ring and to the contact.

10. The method of claim 1, wherein the conductor device includes an electrically conductive drive hub, an electrically conductive drive shaft and an electrically conductive motor, the method comprising:

dissipating the electrical charge from any of the electrically conductive drive hub, the electrically conductive drive shaft and the electrically conductive motor to the contact.

11. The method of claim 10, wherein an outer surface of the singulating device is coupled in an electrically conductive manner to one or more of the electrically conductive drive hub, electrically conductive drive shaft and electrically conductive motor, the method comprising:

dissipating the electrical charge from the outer surface of the singulating device to any of the electrically conductive drive hub, the electrically conductive drive shaft and the electrically conductive motor.

12. The method of claim 11, wherein the electrically conductive motor is coupled in an electrically conductive manner to the contact, the method comprising:

dissipating the electrical charge from the electrically conductive motor to the contact.

13. The method of claim 1, wherein a bottom surface of the storage container is electrically conductive and electrically coupled to the contact, the method comprising:

dissipating the electrical charge from the bottom surface of the storage container to the contact.

14. The method of claim 1, wherein a surface of a housing of the storage container that comes into contact with drug portions is electrically conductive and electrically coupled to the contact, the method comprising:

dissipating the electrical charge from the surface of the housing of the storage container to the contact.

15. The method of claim 1, wherein a coupling is disposed between the singulating device and a drive for rotating the singulating device, wherein the coupling is electrically conductive and is electrically connected to an outer surface of the singulating device, the method comprising:

dissipating the electrical charge from the outer surface of the singulating device to the coupling.

16. The method of claim 1, the method comprising:

transferring the electrical charge from an electrically conductive outer surface of the singulating device to the electrically conductive coupling.

17. The method of claim 16, wherein the conductor device includes an electrically conductive drive hub, an electrically conductive drive shaft and an electrically conductive motor, the method comprising:

transferring the electrical charge from the electrically conductive coupling to at least one of the electrically conductive drive hub and the electrically conductive drive shaft.

18. The method of claim 17, the method comprising:

transferring the electrical charge from the at least one of the electrically conductive drive hub and the electrically conductive drive shaft to the electrically conductive motor.

19. The method of claim 18, the method comprising:

transferring the electrical charge from the electrically conductive motor to the contact; and transferring the electrical charge from the contact external to the storage and dispensing station.

* * * * *